US008607271B2

(12) United States Patent
Seppälä

(10) Patent No.: US 8,607,271 B2
(45) Date of Patent: Dec. 10, 2013

(54) METHOD TO DELIVER MESSAGING TEMPLATES IN DIGITAL BROADCAST SERVICE GUIDE

(75) Inventor: Martta Aino Adele Seppälä, San Diego, CA (US)

(73) Assignee: Nokia Corporation, Espoo (FI)

( * ) Notice: Subject to any disclaimer, the term of this patent is extended or adjusted under 35 U.S.C. 154(b) by 1248 days.

(21) Appl. No.: 11/212,114

(22) Filed: Aug. 26, 2005

(65) Prior Publication Data

US 2006/0019618 A1 Jan. 26, 2006

(51) Int. Cl.
*H04N 5/445* (2011.01)

(52) U.S. Cl.
USPC .............. 725/39; 455/3.06; 455/121; 725/36; 725/61; 725/140; 709/204; 709/208

(58) Field of Classification Search
USPC ........ 725/39, 36, 140, 61; 709/204, 224, 208, 709/223, 226, 206; 455/121, 3.06
See application file for complete search history.

(56) References Cited

U.S. PATENT DOCUMENTS

| | | | | |
|---|---|---|---|---|
| 5,663,757 | A * | 9/1997 | Morales | 725/5 |
| 7,222,155 | B1 * | 5/2007 | Gebhardt et al. | 709/204 |
| 7,233,990 | B1 * | 6/2007 | Debaty et al. | 709/224 |
| 2003/0088778 | A1 * | 5/2003 | Lindqvist et al. | 713/182 |
| 2003/0211856 | A1 * | 11/2003 | Zilliacus | 455/466 |
| 2004/0186889 | A1 * | 9/2004 | Washburn | 709/206 |
| 2004/0237109 | A1 * | 11/2004 | Laitinen et al. | 725/62 |
| 2005/0090235 | A1 * | 4/2005 | Vermola et al. | 455/414.3 |
| 2005/0259604 | A1 * | 11/2005 | Salmi | 370/310 |
| 2006/0190966 | A1 * | 8/2006 | McKissick et al. | 725/61 |

FOREIGN PATENT DOCUMENTS

| | | | |
|---|---|---|---|
| EP | 0551433 | | 5/2001 |
| EP | 1 909 498 | A1 | 4/2008 |
| JP | 2001-1292425 | A | 10/2001 |
| RU | 2 384 953 | C2 | 3/2010 |
| WO | WO 03/032148 | | 4/2003 |
| WO | WO03/034735 | | 4/2003 |
| WO | WO 2004/015917 | | 2/2004 |
| WO | WO 2004/056096 | A1 | 7/2004 |

OTHER PUBLICATIONS

OMA-BCAST-2005-0360-Interaction Simplified, Aug. 14, 2005, http://member.openmobilealliance.org/ftp/public_documents/bcast/2005/ see section 5.1.1-5.1.4.

(Continued)

*Primary Examiner* — Brian Pendleton
*Assistant Examiner* — Alan Luong
(74) *Attorney, Agent, or Firm* — Ditthavong Mori & Steiner, P.C.

(57) ABSTRACT

Provided are apparatuses and methods for transmitting and receiving ESG fragments associated with an event or program. The event or program may have an interaction service component in which a subscriber can interact with the program in real-time. The program content information, such as audio and video data associated with the program may be transmitted to a subscriber in an ESG fragment. The ESG fragment may have associated metadata in which information pertaining to the interaction service component of the event or program may be mapped. The subscriber terminal or receiver can parse the ESG fragment data to determine attributes for displaying a message template associated with the interaction service component of the event or program. Subscriber interaction with the program can be provided through the message template.

36 Claims, 9 Drawing Sheets

(56) References Cited

OTHER PUBLICATIONS

OMA-BCAST-2005-0331-MMS-Message-Template, Aug. 12, 2005, http://member.openmobilealliance.org/ftp/public_documents/bcast/2005/ see slides 1-7, 15.
Service Guide for Mobile Broadcast Services, Draft Version 1.0, Aug. 18, 2005, OMA-TS-BCAST_ServiceGuide-V1_0_20050818-D; http://member.openmobilealliance.org/ftp/public_documents/bcast/2005/.
Open Mobile Alliance, Service Guide for Mobile Broadcast Services, Draft Version 1.0, OMA-TS-BCAST_ServiceGuide—V1_0_0-20050818-D, Aug. 18, 2005.
U.S. Appl. No. 10/917,700, filed Aug. 18, 2004.
Mexican Office action for corresponding MX patent App. No. MX/a/2008/002599 dated Jul. 1, 2010, pp. 1-3.
Supplementary European Search Report for related European Application No. EP 06 75 5975 dated Mar. 15, 2012, pp. 1-4.
Office Action for related Canadian Patent Application No. 2,619,684 dated May 6, 2011, pp. 1-3.
Office Action for related Chinese Patent Application for 200680035494.0 dated Jan. 20, 2010, pp. 1-37.
Office Action for related Chinese Patent Application No. 200680035494.0 dated Oct. 9, 2011, pp. 1-8.
Office Action for related Chinese Patent Application No. 200680035494.0 dated Jun. 4, 2012, pp. 1-24.
Office Action of corresponding Chinese Patent Application No. 2006800354940 dated Jan. 29, 2010, pp. 1-17, CHINA.

* cited by examiner

METHOD TO DELIVER MESSAGING TEMPLATES IN DIGITAL BROADCAST SERVICE GUIDE

FIELD OF THE INVENTION

The invention relates generally to communications networks. More specifically, the invention relates to message templates in Electronic Service Guides that are used in communication networks.

BACKGROUND OF THE INVENTION

Generally, an Electronic Service Guide (ESG) enables a terminal to obtain information relating to what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). ESG fragments may also be transmitted by using Asynchronous Layered Coding (ALC) and File Delivery over Unidirectional Transport (FLUTE) protocols. Data is often transmitted through the Internet addressed to a single user. It can, however, be addressed to a group of users, commonly known as multicasting. In the case in which the data is addressed to all users it is called broadcasting.

When interaction services offerings are provided to a subscriber of a broadcast or multicast program, an additional channel or communication link is needed for providing the interactive services. For example, if a subscriber is receiving a broadcast program in which the subscriber can interact with the program by responding to prompts in the program, the subscriber's input is provided to the service providing entity via a channel or communication link that is separate from the channel over which the program is being broadcast. This requires large overhead which results in a burden on the use of resources in the broadcast system.

In addition, subscribers must manually enter input into the system in a non-uniform manner. If the user erroneously inputs the wrong data, the wrong data will be received which may result in the undesired results. For example, the subscriber may send a non-functional answer message which does not produce desired results. Also, the subscriber would still be charged for the erroneous, non-functional answer message. Hence, there is a high risk of errors resulting in unsuccessful service or interaction requests in such a system. Moreover, there is no standardized method of specifying message interaction.

Therefore, there is a need for a method and system for providing interaction service offerings to subscribers in an efficient, flexible, and cost-effective manner. There is also a need to provide a method and system for providing interaction service offerings to a subscriber in a manner that can minimize or eliminate the frequency of errors in subscriber input.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example of the present invention, a transmitter is provided for transmitting a program or an event to a subscriber. In this example, an input receives the program content and transmits the program in an ESG fragment. The ESG fragment may have associated metadata and data associated with a message template of an interactive component of the program. The data associated with the message template may be mapped into the metadata of the message template. Data and elements associated with the interaction service of the event may be parsed from the metadata of the ESG fragment.

In another example of the present invention, a receiver is provided for receiving an ESG fragment containing an event. The ESG fragment may also be associated with metadata which may include a predetermined interaction element for creating a message template.

In another example of an aspect of the present invention, a method for providing data of an event in an ESG fragment and providing an interaction service offering associated with the event. The event may also have a subscriber interaction component in which a user can input data or requests and communicate with the program. Information associated with the interaction component can be mapped into metadata associated with the ESG fragment.

In another example of an aspect of the present invention, a method for providing an interaction service offering associated with an event is provided in which a first content file containing a video or audio stream of an event is provided to a subscriber terminal. A second content file containing data associated with an interaction service associated with the event is also provided. Also, a message template can be created and displayed at a subscriber terminal based on the data corresponding to the interaction services of the event.

Also, in another example of an aspect of the present invention, an ESG fragment containing data of an event can be received at a subscriber terminal. The ESG fragment can also have associated metadata in which data corresponding to a pre-configured message template can be mapped.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
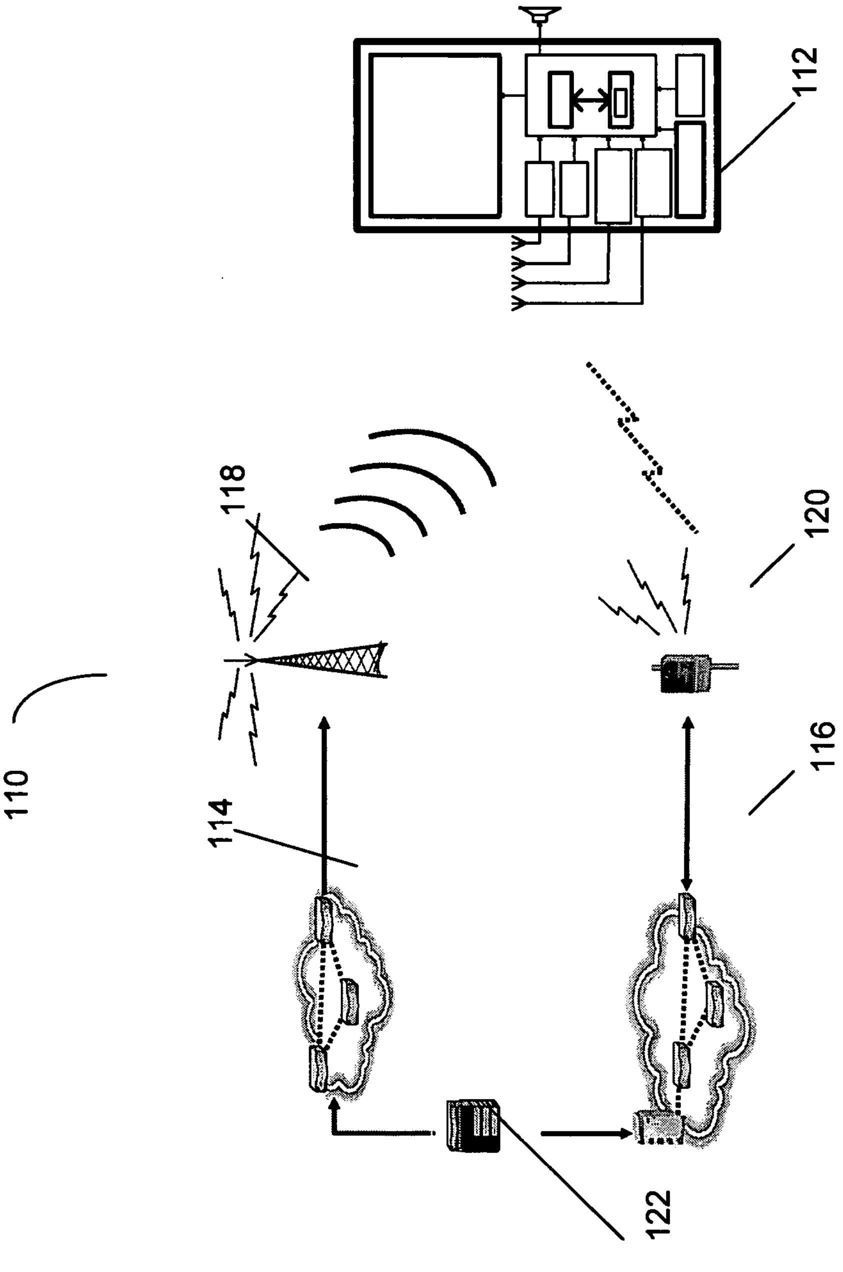
FIG. 1 illustrates a block diagram of a wireless communication system in which various aspects of the present invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

One way of broadcasting data is to use an IP data casting (IPDC) network. IPDC is a combination of digital broadband broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H), a recently developed technology that increases the capabilities and services available on small handheld devices, such as mobile telephones. The DVB-H is designed to deliver data to wireless terminal devices taking into consideration the characteristics of battery-powered devices.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

The present invention, however, is also is applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

ESG fragments may be efficiently transported to a receiver through the formation of containers. In this sense, a container comprises at least one ESG fragment, but may contain a plurality of fragments. Alternatively, a fragment may be carried in more than one container. The containers are transported to the receiver, for example, by using Asynchronous Layer Coding (ALC)/Layered Coding Transport (LCT) such that a single ALC/LCT transport object corresponds to a single container. The fragments can be utilized by the receiver upon reception of the entire container. Aspects of the present invention utilize a simple and extensible header structure apart from the fragments independent of the type and format of the individual fragments. In further embodiments, compression is applied over the entire container, including the fragments and any headers. In yet further embodiments, other envelopes, such as, e.g. a 3GPP metadata envelope may be carried within the container without the need for unnecessary repetition of parameters, such as for example, version, validity time, and identification.

Metadata within a 3GPP (3rd Generation Partnership Project) envelope or in any other form may include specific channels, specific programs, and/or specific channel bundles. Other types of metadata may include: package data, purchase data, such as operator identity data and technical data for performing the transaction, e.g., an address, protocol, price data which may be based upon package/day, channel/minute, program/minute; channel data, such as a textual description for a user, content provider branding information/logo, classification and rating data, such as genre and parental rating, channel SDP data, such as a description of capabilities needed to use the service, e.g., audio and video format and bit rate information, start and end time, addresses, addresses of synchronized auxiliary data feeds, proprietary extensions; and program data, such as a textual description for a user, start and end times, references for interactive services related to the program. This metadata may be loaded by an operator or may be performed automatically.

The present invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. Although mobile devices are described, the present invention is not so limited. For example, aspects of the present invention may be provided in stationary devices. In an example of a stationary device, a backchannel for contacting the service providing entity may further be provided. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation/fourth-generation (2G/3G/4G) cellular data communications network, a Global System for Mobile communications network (GSM), OMA broadcast networks, FLO, MBMS, or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
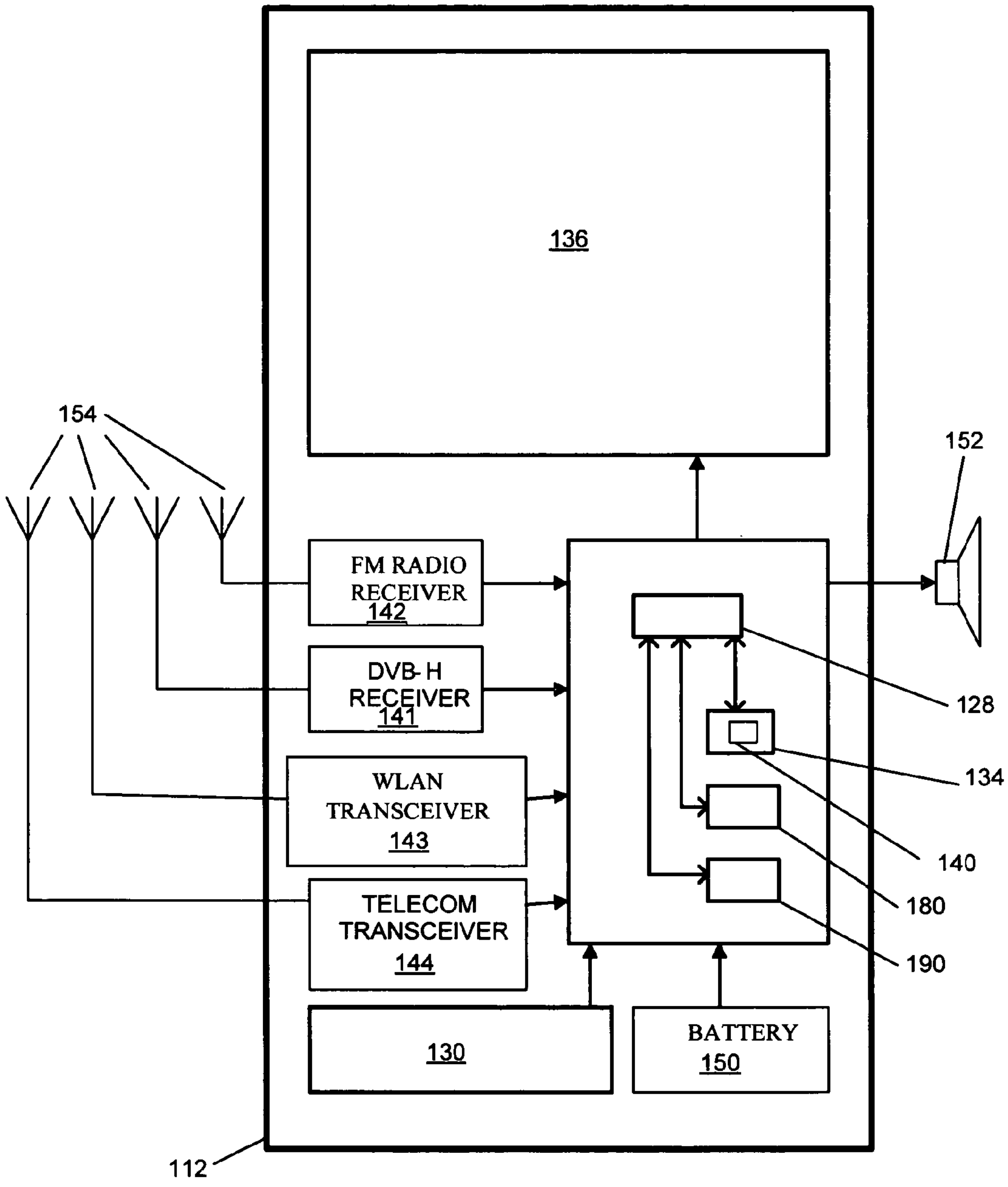
FIG. 2 illustrates a block diagram of a mobile terminal in accordance with an aspect of the present invention.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like. In addition, the mobile device 112 may include a parsing module 180 for receiving information in a service guide (i.e., ESG fragment) and parsing the information to determine elements, sub-elements and attributes for compiling a service/interaction offering or message template. Also, the mobile device 112 may include a template compiler 190 for compiling a message template based on the attributes or sub-elements in the ESG fragment.

Computer executable instructions and data used by processor 128 and other components within mobile device 112 may be stored in a computer readable memory 134. The memory may be implemented with any combination of read only memory modules or random access memory modules, optionally including both volatile and nonvolatile memory, wherein some of the memory modules may be detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process transmissions based on the Digital Video Broadcast (DVB) standard, such as DVB-H or DVB-MHP, through a specific DVB receiver 141. Additionally, receiver device 112 may also be configured to receive, decode and process transmissions through FM/AM Radio receiver 142, WLAN transceiver 143, and telecommunications transceiver 144. Further the mobile device may be configured to receive transmissions based on the Digital Audio Broadcasting (DAB) standard (not shown). In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Figure 3:
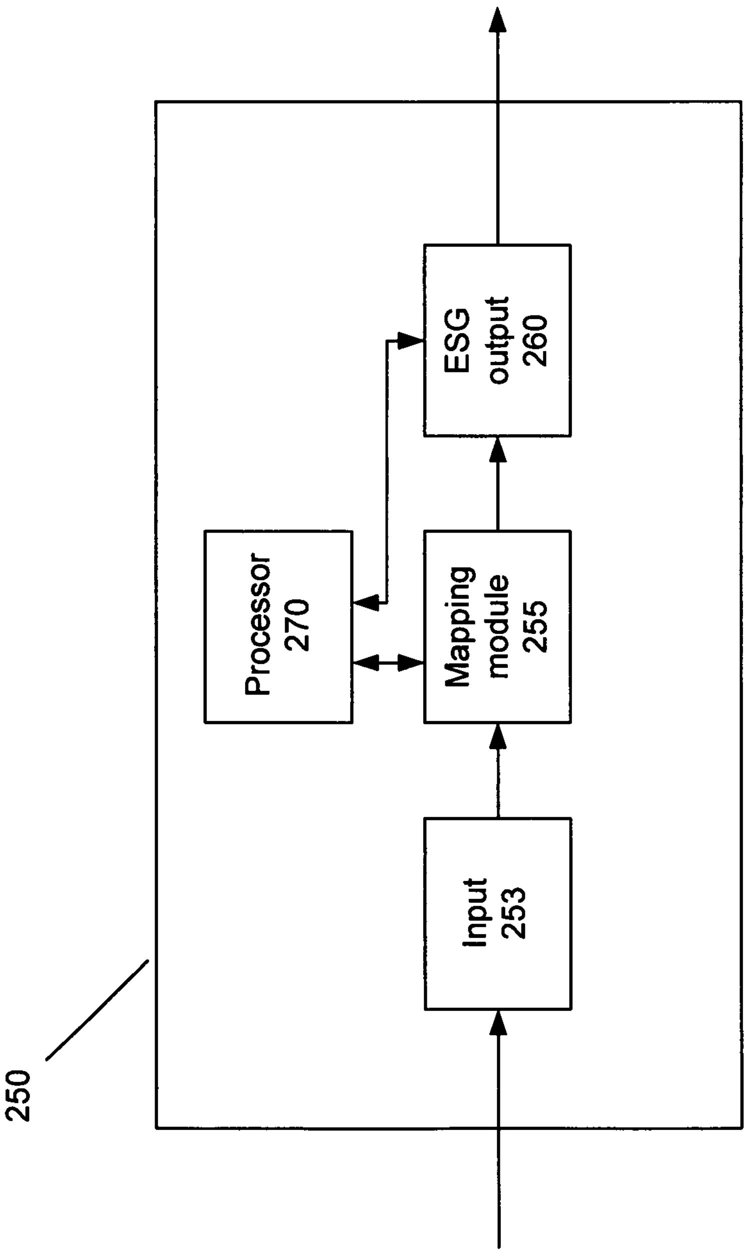
FIG. 3 illustrates a block diagram of an example of a service provider or transmitter for providing an event with associated service interaction offering information in accordance with an aspect of the present invention.

FIG. 3 illustrates an example of a service provider for providing an event with associated service interaction offering information. In this example, the service provider 250 includes an input 253 for receiving information relating to an event. For example, information relating to a program such as program content can be received for compilation in the input 253. The event or program can also include associated interaction such that a subscriber may interact with the program. Such interaction may include, for example, inputting a selection provided by the program or communicating with the program such as sending an e-mail. More detailed examples of subscriber interaction with the program are provided below.

The service provider 250 may further include a processor 270 for processing an ESG fragment containing, for example, information relating to what services are available to end users and how the services may be accessed. As one example of an ESG fragment, the ESG fragment may comprise XML documents, an SDP (Session Description Protocol) description, textual file, or an image, to name a few, and may also describe one or several aspects of currently available (or future) service or broadcast programs. The ESG fragment may also have associated metadata into which information may be embedded, inserted or mapped.

In addition, the service provider 250 may further include a mapping module 255 for mapping information elements corresponding to a messaging template associated with the interaction service of the program. The mapping module 255 may map the information elements into the metadata of a corresponding ESG fragment that is related to the program. For example, the mapping module 255 maps information elements by embedding attributes into a service guide. As an example, in an SMS message, parameters may be provided for defining characteristics of the message such as the recipient (e.g., to_header) or the content of the message body (e.g., message_body). The mapping module 255 may embed such parameters into the metadata of a service guide (i.e., ESG fragment). In this way, the attributes can be added to a service guide schema (XML schema). As one example, a user interface can be provided for the server application such that input can be received at the server application indicating corresponding interaction service offerings. The service provider 250 can then create a service guide XML schema with the appropriate attributes. The ESG fragment containing service guide information and mapped information elements in the metadata is output by ESG output 260. The messaging template can be used at the subscriber terminal for interacting with the event or program in a standardized fashion that can significantly reduce or even eliminate the possibility of input error on the part of the subscriber. Examples of the messaging template are provided in more detail below.

Figure 4:
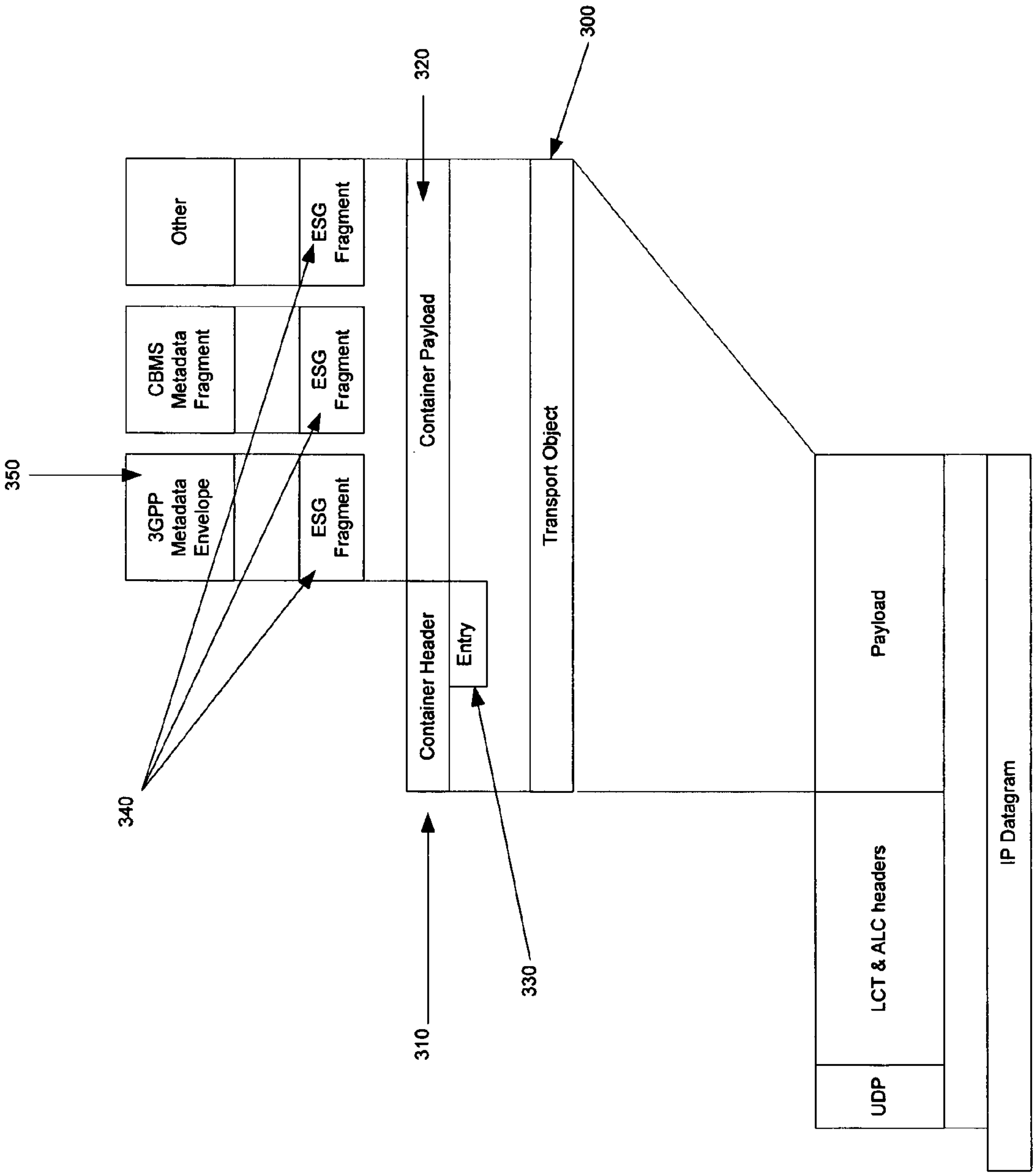
FIG. 4 illustrates a schematic diagram of an example transport object in accordance with an aspect of the present invention.

FIG. 4 is a schematic diagram of an example transport object in accordance with at least one aspect of the present invention. Generally, a single transport object 300 comprises a container header 310 and a container payload 320. By incorporating the header 310 and the payload 320 into a single transport object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a receiver of the entry length of the header.

In the exemplary embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

In one example of the present invention, an ESG fragment may contain service/interaction information such that the service/interaction information can be provided to a subscriber or user of a terminal. In this example, the ESG fragment may contain a predefined service/interaction element that can be detected and displayed at a subscriber terminal based on information received through metadata associated with the ESG fragment. For example, information that can provide a pre-configured service interaction template can be mapped into metadata of an ESG fragment as a predetermined interaction element. A subscriber terminal can parse this information to determine the availability to interact with an accompanying broadcast program. Also, sub-elements of the predetermined interaction element can provide information on alternatives to available interactive services and attributes associated with data to create interactive service requests. Hence, a pre-configured service/interaction request template may be provided to the subscriber based on the ESG fragment metadata.

Figure 5:
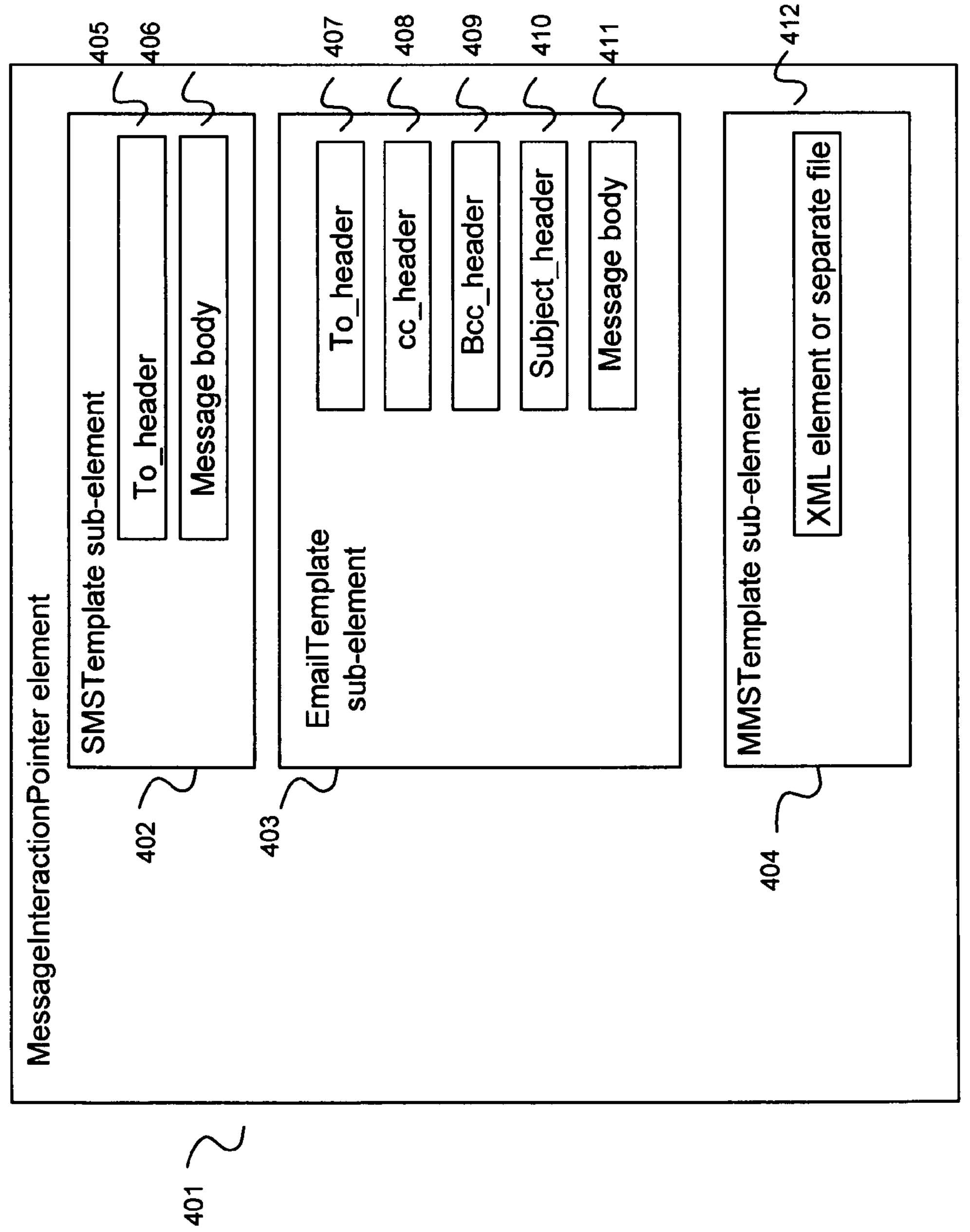
FIG. 5 illustrates a block diagram of an example of a structure of a pre-configured service/interaction request element in accordance with an aspect of the present invention.

Thus, according to an example embodiment of the present invention, a message template or other form of a pre-configured message can be delivered in an ESG fragment of a service guide. Such messaging may be transmitted in a variety of ways such as but not limited to Short Message Service (SMS), Multimedia Message Service (MMS) or E-mail, to name a few. FIG. 5 is a block diagram illustrating one example of a structure of such a pre-configured service/interaction request element for generating a pre-configured service/interaction request template. In this example embodying the present invention, the service/interaction element is defined as a MessageInteraction Pointer 401 that can function as a local reference to the pre-configured service/interaction request template from within an application in the terminal. For example, MessageInteraction Pointer 401 can point to attributes within the metadata that describe a corresponding message template.

As illustrated in the example of FIG. 5, MessageInteractionPointer 401 may contain, according to embodiments of the present invention, sub-elements for configuring or identifying the service/interaction request template. For example, MessageInteractionPointer 401 may contain an SMSTemplate sub-element 402, an EmailTemplate sub-element 403, and an MMSTemplate sub-element 404. The SMSTemplate sub-element may define an application in the terminal and corresponding information to compile a pre-configured SMS message ready to be sent to a predefined recipient destination in response to user activation. In this example, the To_header sub-element 405 of the SMSTemplate sub-element 402 may define the recipient destination to which the SMS message can be sent and the Message body sub-element 406 can contain predefined contents of the message, such as, for example, necessary information to place a vote for one of the available alternatives for voting within an ongoing broadcast program.

The MessageInteractionPointer element 401 of the present example may further contain, according to embodiments of the present invention, an EmailTemplate sub-element 403 to define recipients of an e-mail message and the message contents similarly as discussed above in connection with the SMSTemplate sub-element 402. As FIG. 5 illustrates, EmailTemplate sub-element 403 may contain a To_header sub-element 407 for defining or identifying a recipient of the e-mail message, a Cc_header element 408 for defining or identifying a carbon-copied recipient of the message, a Bcc_header element 409 for defining or identifying a blind carbon-copied recipient of the message, a Subject_header sub-element 410 for defining or identifying a subject of the message and a Message body sub-element 411 for defining or identifying the contents of the message.

The MessageInteractionPointer element 401 may still further contain an MMSTemplate sub-element 404 for defining or identifying an MMS message template. The MMSTemplate sub-element 404 may also be delivered inside the ESG fragment and may contain an XML element or separate file 412 for defining or identifying the message template.

The following table lists examples of sub-elements and attributes of the Message template according to one embodiment of the present invention.

| Name | Type | Category | Cardinality | Description | Data type |
|---|---|---|---|---|---|
| MessagingInter-actionPointer | E1 | O | 0 . . . N | Triggers messaging template delivery to a relevant messaging client. Values: SMS MMS E-mail | LocalURI |
| SMSTemplate | E2 | O | 0 . . . N | Attributes: To-header MessageBody | String |
| To_Header | A | M | 1 . . . N | The recipient SMS message is sent to, expressed as an international-format phone number or any other suitable forum/standard | String |
| MessageBody | A | O | 0 . . . 1 | Message body of any suitable forum/standard | String (166 characters) |
| EmailTemplate | E2 | O | 0 . . . N | Attributes: To-header Cc_header Bcc_header Subject_header MessageBody | String |
| To_header | A | M | 1 | The e-mail recipient(s) in any suitable forum/standard | String |
| Cc-header | A | O | 0 . . . 1 | E-mail cc-recipient(s) of any suitable forum/standard | String |
| Bcc_header | A | O | 0 . . . 1 | E-mail bcc-recipient(s) of any suitable forum/standard | String |
| Subject_header | A | O | 0 . . . 1 | E-mail subject header of any suitable forum/standard | String |
| MessageBody | A | O | 0 . . . 1 | E-mail message body of any suitable forum/standard | String |
| MMSTemplate | E2 | O | 0 . . . 1 | MMS template of any suitable forum/standard MMS template XML schema may be transported in a Service Guide as a string, handed to an MMS client in a terminal for translating into an MMS template. | String |

Where the type can be an Element (E), an Attribute (A), a first level sub-element (E1), or a second level sub-element (E2) and the category can be optional (O) or preferred/mandatory (M).

Figure 6:
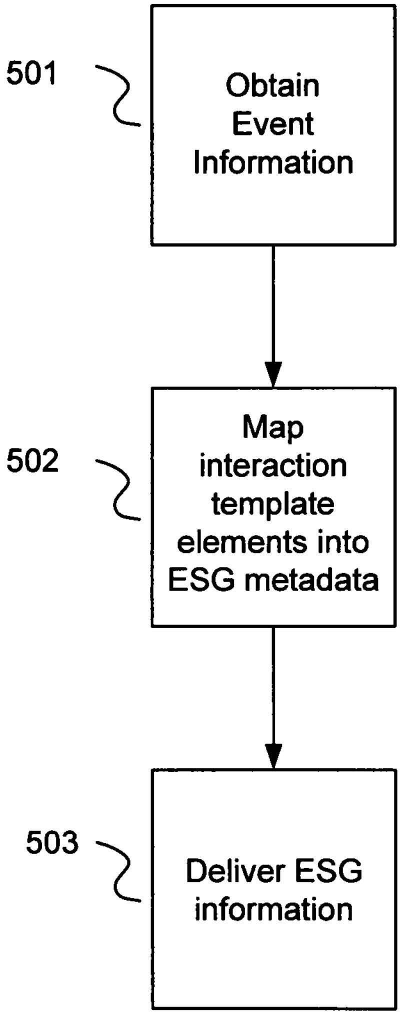
FIG. 6 illustrates a flow chart of an example of a method of providing interactive services in accordance with an aspect of the present invention.

FIG. 6 is a flow chart illustrating an example of a method of providing interactive services according to at least some aspects of the present invention. In this example, event information is obtained (STEP 501) prior to delivering information pertaining to the event to a subscriber. For example, a broadcast program can be received for transmission as part of a service guide or ESG fragment. In addition to the broadcast program information in the ESG fragment, information corresponding to a message template can be mapped into the metadata of the ESG fragment (STEP 502).

In one example, the message template is created with the service guide by providing elements and attributes for creating a message such that a subscriber need not manually enter information when creating the message. For example, a service provider can create a service guide for transmission to a subscriber and can include information in the service guide fragment such as elements or attributes for creating the message template. If, for example, a pointer element (e.g., MessagingInteractionPointer element described above) is embedded into a service guide fragment (i.e., ESG fragment), a subscriber terminal can identify the elements or attributes embedded in the ESG fragment or in the metadata of the ESG fragment based on the pointer element. In an example of an SMS message, an SMS client can place the attributes in corresponding fields to pre-configure a message template containing the information. In this case, a subscriber need not manually enter corresponding message information. For example, the SMS client can place a recipient attribute in a recipient field (e.g., to_header) and can place the body of the message in a messagebody field to pre-configure an SMS template including the recipient and message body. Thus, attributes that can be used for creating a message template for sending a message may be transmitted to a subscriber in an ESG fragment. This method can be used in any form of messaging. For example, an MMS message can use corresponding attributes or parameters to send a pre-configured template in a similar fashion.

The template that is created can include a standard XML form based on the attributes embedded in the ESG fragment which a client can support. Thus, the ESG fragment may carry the template XML scheme as well as the attributes that are used to create a subscriber message. In one example, a subscriber terminal creates a message template including pre-configured information based on the attributes received in an ESG fragment. In another example, the server application may create a standardized message template. For example, in MMS messaging, the message template may be a standardized feature created by the server application and embedded in an ESG fragment as described herein. This information corresponding to a message template can be, for example, attributes such as those described in the table above and on FIG. 5 including various pieces of information that are mapped as sub-elements in the ESG fragment metadata. By mapping of the sub-elements into the metadata of the service guide or ESG fragment, the attributes can be filled in or included in the metadata of the ESG fragment as part of the service guide schema. As an alternative, the attributes can be sent in a separate file that is referenced by the ESG fragment. In STEP 503, the ESG fragment with the metadata containing the attributes corresponding to the message template are delivered to a subscriber terminal.

Figure 7:
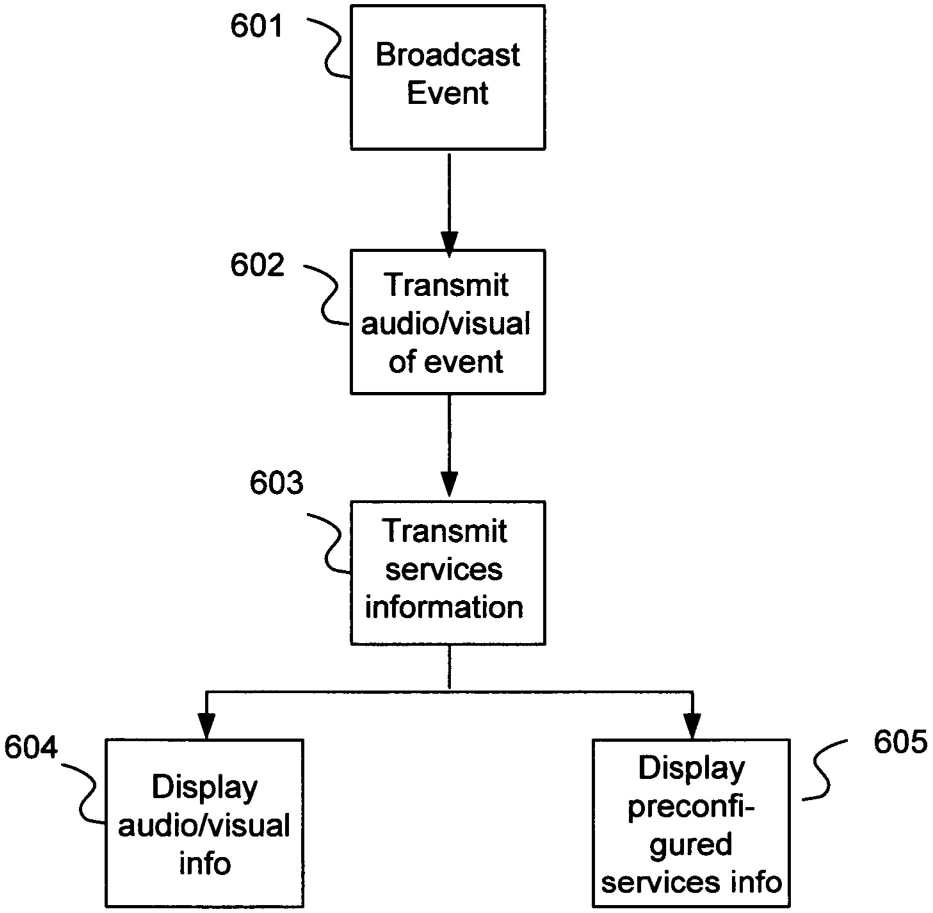
FIG. 7 illustrates a flow chart of an example of delivering a broadcast program and data associated with interaction services in accordance with an aspect of the present invention.

Hence, in this example, the service provider can send a broadcast program, such as video and audio streams for a program and accompanying data associated with interaction services that can be displayed at a subscriber terminal simultaneously. FIG. 7 is a flowchart illustrating an example of delivering the broadcast program and data associated with interaction services via an ESG fragment and metadata. In this example, the broadcast event containing both video/audio streams and interaction services is prepared for delivery (STEP 601). The service provider transmits the video/audio stream for the program or event (STEP 602). The service provider also transmits service guide information within an ESG fragment. Interactive services information (STEP 603) mapped as sub-elements in ESG fragment metadata may also be transmitted from the service provider. Mapping can include, for example, embedding the sub-elements or attributes into a service guide or XML schema. For example, if an SMS message is being sent, parameters or attributes indicating the recipient or message body content can be included or mapped into metadata of the service guide schema (XML schema) or ESG fragment. As an alternative, the parameters can be sent in a separate file that is referenced by the ESG fragment. Thus, in one example, the necessary information is added as one or more ESG metadata elements as disclosed in FIG. 5, wherein the one or more elements may include an indicator to wake up a broadcast client in the receiving terminal to parse the interactive services information. For example, the interactive services information can be an HTML file offering information about interactive service offerings. The file containing the interactive service offerings can be referred to as an “interaction page.”

As illustrated in the example of FIG. 7, the audio/visual information of the event or program can be displayed at a subscriber terminal 604. The subscriber terminal can also display a preconfigured template associated with the interactive services (STEP 605). Step 605 as such may be optional. For example, the subscriber may activate sending of interactions services request without needing to know details relating to the destination or the coding that identifies the option. The interactive services can also be concurrently displayed with the preconfigured template or message template. The preconfigured template or message template can be obtained at the subscriber terminal by parsing of the corresponding ESG fragment metadata. For example, a mobile broadcast subscriber may receive an ESG fragment that includes elements and attributes associated with the message template. The subscriber terminal may parse the ESG fragment to identify the attributes. For example, parsing of the ESG fragment in an SMS schema may identify a recipient (e.g., to_header) and a message body. Based on the identified attributes, an SMS client can construct an SMS to include the identified attributes from the ESG fragment. The subscriber can, for example, select an option on a resulting message template to send the actual SMS.

In another example, a pointer element such as MessagingInteractionPointer may be received at a broadcast client application. The text of a template (XML scheme) can be parsed out and handed to a client application as a string. The client can recognize the template scheme as an XML and parse out attributes from the string. Such attributes may include, for example, a recipient or a message body. The client application may then create a pre-configured message. Also, the pre-configured message may be modified by a subscriber prior to sending, if desired.

Figure 8:
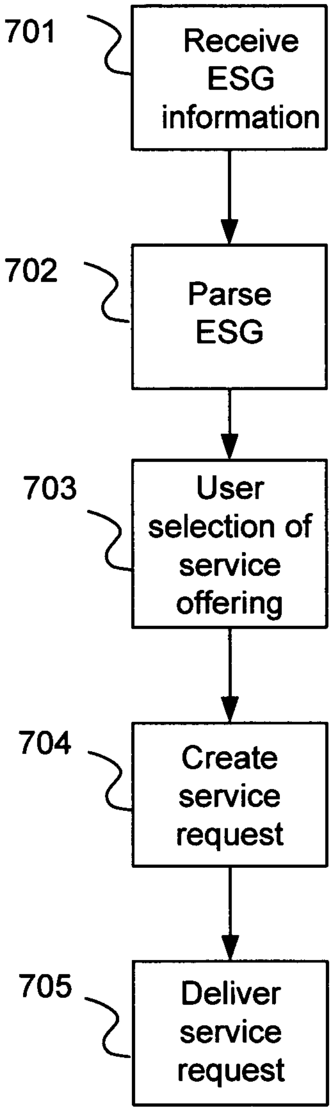
FIG. 8 illustrates a flow chart of an example of receiving ESG fragment information and metadata at a subscriber terminal in accordance with an aspect of the present invention.

The subscriber terminal may receive the ESG fragments associated with the service guide and containing information corresponding to a broadcast program and associated interactive services. FIG. 8 is a flowchart illustrating an example of receiving ESG fragment information and metadata at a subscriber terminal embodying the present invention. In this example, ESG fragment information is received (STEP 701). This information may include program content such as audio and/or video stream of a program. The ESG fragment may contain an element for identifying or pointing to attributes mapped in the metadata of the ESG fragment for a messaging template. An example of such an element is a MessagingInteractionPointer element. The subscriber terminal detects the presence of an element, such as, for example, the MessagingInteractionPointer element within the metadata of the ESG fragment and parses the data (STEP 702) to obtain the information contained within the element to determine attributes for compiling a pre-configured messaging template. For example, for an SMS messaging template, the attributes may include To_header and Messagebody for defining the recipient to receive the SMS message (To_header) and the content of the message (Messagebody). Based on the attributes, the messaging template can be displayed at the subscriber terminal.

The subscriber can interact with the service by selecting a service offering (STEP 703) based on the received pre-configured interaction options. In this example, a subscriber can select an option through the messaging template. The resulting primitive can be sent to an SMS client to create the pre-configured service request (STEP 704). In some examples, the subscriber can further acknowledge the interaction. For example, a subscriber can place a purchase order as an interactive input and can also confirm that the order was placed. Also, in some examples, a reply message or other appropriate response can be delivered (STEP 705) by delivering the service request.

For illustration purposes, an example of the method of FIG. 8 is provided. A television program such as “American Idol” is provided by a service provider to subscriber terminals. Associated with the program “American Idol” are interactive service offerings in which subscribers or viewers can vote for contestants on the program. In transmitting the program to viewers in this example, at least two types of content files may be provided. A first type of content file is the video and audio stream for the “American Idol” program. Another type of content file provided to the subscriber terminal is a file, such as an HTML file, for offering information about interactive services associated with the program. In this example, viewers have the opportunity to interact with the program by voting for their favorite (or least favorite) contestants to vote them off the show (or the keep them on the show). The interaction services can be provided on a document page that can be referred to as an “interaction page.” This interaction page can provide options for the viewer to vote for contestants as well as provide any other pertinent information.

Information pertaining to the program that is presented to subscribers may be delivered in a variety of way. In one example, a “teaser” can be provided for the “American Idol” program such as “Vote for Reuben or Clay”. This information can be delivered, for example, as part of the service guide. If the information is provided as part of the service guide, the subscriber terminal may parse the information based on accompanying attributes also received in the service guide. The information may be displayed to the subscriber who views the information on a display. Thus the information may appear as a portion of the actual broadcast to the subscriber, if desired. Alternatively, the information may be delivered as part of the service guide but in an extension fragment that may be accessible via an extension parameter. An example of an extension parameter for access to the extension fragment includes ExtensionURI(type AnyURI) that can be offered by relevant ESG fragments. The information may be delivered or displayed at any time in reference to delivery of the broadcast. For example, the information may be delivered or displayed at the same time as the broadcast or at a different time, such as the next day (e.g., to remind viewers that the "American Idol" vote is continuing).

In another example of delivering program information such as a teaser for the "American Idol" program, the program information may be delivered as part of broadcasting. For example, the program information may be delivered in the video/audio stream of the broadcast itself to appear on the display as part of the broadcast. Alternatively, the information may be delivered as part of the broadcast but in a separate file. For example, the information may be delivered in an HTM filed that is separate from the broadcast and may be displayed to the user on a display either simultaneously with the broadcast or at a separate time. If the information is delivered or displayed at a separate time, the information may be displayed, for example during the broadcast of a different program or during a commercial or advertisement, if desired.

The program content of the "American Idol" program in this example is received at the subscriber terminal. The subscriber terminal also receives a pointer to attributes associated with a message template. The attributes can be mapped to the metadata associated with a corresponding ESG fragment. For example, the pointer can be a MessagingInteractionPointer element for indicating attributes in the metadata of the ESG fragment that may identify and characterize the messaging template. The information of the ESG fragment received can also contain data of the message header and body, or the content of the message. The subscriber receiver may parse the received ESG fragment data to obtain a pointer to the message template from the attributes in the metadata of the ESG fragment. The message template can be displayed to the subscriber based on the attributes. In one example, the message template provides voting options and cost information for placing a vote.

The subscriber may cast a vote by selecting a corresponding choice. For example, a message template may contain a button, link or other icon or a list of such buttons, links or other icons, which a subscriber can click. Clicking the desired button or link may cause transmission of a primitive and placement of a vote for the selected corresponding individual or contestant.

In this example, the messaging template may contain any pertinent information in a pre-configured format. For example, the interaction page may also provide an option for sending fan e-mail to a desired contestant. In this example, the attribute To_header and subject_header may be pre-defined so that when the client application receives the ESG fragment (i.e., the content of the program) including the pointer element MessagingInteractionPointer (e-mail), the application provides the attributes (e.g., To_header and subject_header) to an e-mail client that can be started to prompt the user to write a message body.

In another example of the method of FIG. 8, a user can purchase a ringtone for a mobile device. In this example, a service provider provides program information such as video and/or audio data and a file providing information about interaction services (i.e., an "interaction page"). An ESG fragment is received at the subscriber terminal containing a pointer to attributes for a message template that can be mapped in the metadata of the ESG fragment. The pointer may be a MessagingInteractionPointer element that points to attributes such as To_header (identifying the recipient of the data) or Messagebody (providing the message content). In this example, the user may place an order for a ringtone. Also, the user can confirm or acknowledge the purchase for additional security. For example, the message template may provide an additional interface requesting that the user acknowledge that the user intended to place the order to which the user may respond by, for example, clicking an icon or link. Also, the service provider may then provide the requested ringtone to the user. Alternatively, the service provider can provide a hyperlink to indicate where the link can be retrieved.

In another example of the delivering message templates, a subscriber or viewer of a program can send e-mail to a contestant on the program. In this example, a program such as "American Idol" is transmitted to viewers. Service guide information can also be transmitted to the subscriber in an ESG fragment with attributes corresponding to a message template mapped in the metadata of the ESG fragments. The subscriber terminal may parse the ESG fragments, identify the attributes and display the message template such as an interaction page. The interaction page may provide any type of pertinent option. In this example, the options include an option to send an e-mail to a selected contestant on "American Idol."

In this example, attributes such as to_header and subject_header may be pre-defined at the service provider. For example, the subject_header attribute can be defined as "Fan-mail to Reuben" such that selection of the corresponding option causes an e-mail to be sent to Reuben (a contestant on the program) with "Fan-mail to Reuben" as the subject. The program content is transmitted from the service provider to the viewer at the subscriber terminal in an ESG fragment. The ESG fragment also includes the pointer element (e.g., messagingInteractionPointer(e-mail) element) that identifies the attributes to the subscriber terminal. In this example, the attributes identified may be a to_header and a subject_header (e.g., "Fan-mail to Reuben"). A corresponding message template is displayed at the subscriber terminal which provides an option to send a fan e-mail. Selection of the option can then prompt the viewer to write a message, include attachments, etc.

Figure 9:
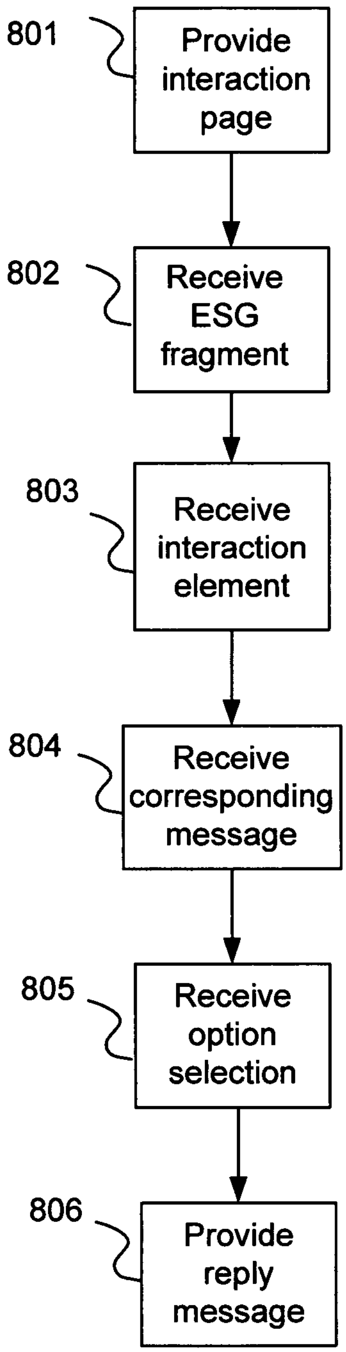
FIG. 9 illustrates an exemplary flow chart of providing a message template at a subscriber terminal in accordance with an aspect of the present invention.

FIG. 9 is a flowchart of an example of providing a message template at a subscriber terminal. In this example, an ESG fragment is received in STEP 802 at a subscriber terminal. The ESG fragment may be associated with an event or program. The subscriber terminal also receives data corresponding to an interaction element associated with the ESG fragment (STEP 803). Also, the subscriber terminal may receive a pointer associated with the ESG fragment in a corresponding message (STEP 804). Based on the pointer received at the subscriber terminal, an application in the subscriber terminal may obtain associated attributes to provide a message template. The message template may contain a list of options of interactive service offerings. In STEP 805, the system receives a subscriber's selection of an option from the list of options of interactive service offerings. Based on the option selection, the system can provide a reply message (STEP 806), if desired. For example, if a subscriber wants to send an e-mail to a contestant on a television game show, the subscriber can select an option from the list of options to choose to compose and send an e-mail. The system can respond to the option selection by displaying a reply message (STEP 806) such that the subscriber can be apprised of the processing of the selected option.

Thus, in summary, a system and method is described in which a program may be provided from a service provider to a subscriber terminal that includes a pointer element indicating attributes for displaying a message template for interactive services associated with the program at the subscriber terminal. The program content, such as audio or video associated with the program, can be transmitted in an ESG fragment and the attributes can be mapped in the metadata of the ESG fragment. The message template is standardized such that the user need not know the type of interaction. Selection of a desired option in the message template can return a pre-configured message to the service provider. Depending on the form of interaction, further user interaction is not necessary. For example, if the interaction pertains to voting for a contestant on a live game show such as "American Idol", the subscriber can select the option on the message template corresponding to the desired contestant. Not additional input from the subscriber is necessary. However, if the subscriber wishes to also send an e-mail to the contestant, the subscriber may then input the message after selection of the e-mail option.

In another example embodiment of the present invention, the event information in the ESG fragment may be provided to the subscriber in conjunction with the pointer element and attribute information. Thus, a subscriber can receive the program or event information (e.g., program content) at the same time as the interaction service offering. In this way, the subscriber can be apprised of the availability and selection of interaction services associated with each event or program in a plurality of events or programs while browsing.

In another example embodiment of the present invention, ESG fragment information can be used by a plurality of applications. In this example, the ESG fragment is a transport for providing the interaction service offerings associated with events. The information for providing the message template (e.g., attributes or sub-elements) may be received through an ESG fragment update while the subscriber is viewing a program or event. Thus, a subscriber can receive the information for providing a message template and updates to the information for providing the message template and display the message template while viewing the event or program.

Also, according to embodiments of the present invention, the interaction service offerings may be provided in certain select areas of the display. For example, the interaction service offerings may be displayed in a message template in a designated area of a display, as desired. The designated area of a display may be defined within the ESG fragment information, or alternatively, the designated area of the display may be defined by the original content stream.

In another example embodiment of the present invention, a computer-readable medium is provided containing computer-readable code for mapping attributes, elements, and/or sub-elements associated with a message template. The message template may be associated with interactive service offerings of an event or program. The message template may, for example be displayed at a subscriber terminal and may provide a list of options for selection by the subscriber.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

I claim:

1. An apparatus comprising:

at least one processor; and at least one memory including computer program code, the at least one memory and the computer program code configured to, with the at least one processor, cause the apparatus to perform at least the following, receive data associated with a broadcast event, the data including an interaction template element associated with a pre-configured message template, the pre-configured message template being associated with an interaction service of the event;

assemble the data into an electronic service guide fragment associated with the event, the electronic service guide fragment having metadata relating to displaying a list of options of interaction service offerings for a subscriber;

map and embed the interaction template element into the metadata of the electronic service guide fragment;

determine to deliver the electronic service guide fragment embedded with the interaction template element via one broadcast channel; and receive, in response to the delivery of the electronic service guide fragment, a pre-configured message that includes subscriber selection of one of the options, wherein the pre-configured message is generated based upon the pre-configured message template either during or after the event, wherein the interaction template element comprises at least one attribute associated with the pre-configured message template, the at least one attribute indicating an e-mail recipient that is a participant in the broadcast event and a subject header for requesting the interaction service of the event to send an e-mail to the participant after the e-mail is displayed to the subscriber.

2. The apparatus of claim 1, wherein the interaction template element comprises a pointer for identifying at least one element associated with the interaction service of the event.

3. The apparatus of claim 2, wherein the interaction template element comprises at least one sub-element associated with the pre-configured message template, the at least one sub-element indicating an application to request for the interaction service of the event.

4. The apparatus of claim 2, wherein the interaction template element comprises at least one attribute associated with the pre-configured message template, the at least one attribute indicating a recipient of a message, message content, an attachment, or a combination thereof for requesting the interaction of the event.

5. An apparatus comprising:

at least one processor; and at least one memory including computer program code, the at least one memory and the computer program code configured to, with the at least one processor, cause the apparatus to perform at least the following, receive, via one broadcast channel, an electronic service guide fragment associated with a broadcast event, the electronic service guide fragment having metadata mapped to and embedded with data of a pre-configured message template, the pre-configured message template being associated with a subscriber interaction service included in the event;

determine within the metadata an interaction template element corresponding to the pre-configured message template;

determine to display information relating to the pre-configured message template to a subscriber, wherein the information relating to the pre-configured message template includes a list of options of interaction service offerings for the subscriber to select; and compile a pre-configured message that includes subscriber selection of one of the options, wherein the pre-configured message is compiled based upon the pre-configured message template either during or after the event, wherein the pre-configured message template is mapped in the electronic service guide fragment to a string according to extensible markup language schema, and the element comprises an attribute that indicates one e-mail recipient that is a participant in the broadcast event and a subject header for requesting the interaction service of the event to send an e-mail to the participant after the e-mail is displayed to the subscriber and the subscriber selects one option from the list of options.

6. The apparatus of claim 5, wherein the interaction template element comprises a pointer.

7. The apparatus of claim 6, wherein the pointer identifies at least one element associated with the interaction service of the event of the received broadcast transmission associated with the electronic service guide fragment, the electronic service guide fragment including metadata.

8. The apparatus of claim 7, wherein the at least one element associated with the interaction service of the event is mapped into the metadata.

9. The apparatus of claim 5, wherein the interaction template element indicates at least one element associated with the interaction service of the event, the at least one element associated with the interaction service including at least one sub-element.

10. The apparatus of claim 9, wherein the at least one sub-element indicates an application to request for the interaction service of the event.

11. The apparatus of claim 5, wherein the-interaction template element indicates at least one element associated with the interaction service of the event, the at least one element associated with an interaction service including at least one attribute.

12. The apparatus of claim 9, wherein the pre-configured message template is based on the at least one attribute.

13. The apparatus of claim 11, wherein the at least one attribute indicates a recipient of a message, message content, an attachment, or a combination thereof for requesting the interaction of the event.

14. A method comprising:

receiving, by an apparatus, data associated with a broadcast event,—the data including an interaction template element associated with a pre-configured message template, the pre-configured message template being associated with an interaction service of the event;

assembling, by the apparatus, the data into an electronic service guide fragment associated with the event, the electronic service guide fragment having metadata relating to displaying a list of options of interaction service offerings for a subscriber;

mapping and embedding, by the apparatus, the interaction template element into the metadata of the electronic service guide fragment;

determining, by the apparatus, to deliver the electronic service guide fragment embedded with the interaction template element via one broadcast channel; and receiving by the apparatus, in response to the delivery of the electronic service guide fragment, a pre-configured message that includes subscriber selection of one of the options, wherein the pre-configured message is generated based upon the pre-configured message template either during or after the event, wherein the interaction template element comprises at least one attribute associated with the pre-configured message template, the at least one attribute indicating an e-mail recipient that is a participant in the broadcast event and a subject header for requesting the interaction service of the event to send an e-mail to the participant after the e-mail is displayed to the subscriber.

15. The method of claim 14, wherein the data corresponding to the pre-configured message template comprises a pointer identifying at least one element associated with the interaction service of the event.

16. The method of claim 15, wherein the at least one element includes at least one sub-element indicating an application to request for the interaction service of the event.

17. The method of claim 15, wherein the at least one element includes at least one attribute associated with the pre-configured message template indicating a recipient of a message, message content, an attachment, or a combination thereof for requesting the interaction of the event.

18. The method of claim 15, wherein the pointer includes one or more universal resource identifiers, and the participant is a contestant in the broadcast event.

19. An apparatus comprising:

at least one processor; and at least one memory including computer program code, the at least one memory and the computer program code configured to, with the at least one processor, cause the apparatus to perform at least the following, display program content from a received broadcast stream;

receive, via one broadcast channel, an electronic service guide fragment associated with a broadcast event, the electronic service guide fragment having metadata mapped to and embedded with data of a pre-configured message template, the pre-configured message template being associated with a subscriber interaction service included in the event;

determine within the metadata an interaction template element corresponding to the pre-configured message template;

display information relating to the pre-configured message template to a subscriber, wherein the information relating to the pre-configured message template includes a list of options of interaction service offerings for the subscriber to select;

receive subscriber selection of one of the options;

compile a pre-configured message that includes the subscriber selection of one of the options, wherein the pre-configured message is compiled based upon the pre-configured message template either during or after the event; and transmit the pre-configured message including the user input to an entity, wherein the event is related to a television program and a first interaction service offering included in the list of options comprises a voting interaction service offering for submitting a vote to interact with the television program and cost information for placing the vote.

20. The apparatus of claim 19, further comprising a cellular network interface configured to transmit the pre-configured message template corresponding to the user input to the entity.

21. The apparatus of claim 19, wherein the apparatus is further caused to display the information relating to the pre-configured message template on a predefined display area based on the information extracted from the electronic service guide fragments.

22. A method comprising:

determining, by an apparatus, to transmit a content file, the content file including a video or audio stream of a broadcast event, wherein an interaction service is associated with the event;

receiving, by the apparatus, data associated with a broadcast event,—the data including an interaction template element associated with a pre-configured message template, the pre-configured message template being associated with an interaction service of the event;

assembling, by the apparatus, the data into an electronic service guide fragment associated with the event, the electronic service guide fragment having metadata relating to displaying a list of options of interaction service offerings for a subscriber;

mapping and embedding, by the apparatus, the interaction template element into the metadata of the electronic service guide fragment;

determining, by the apparatus, to transmit the electronic service guide fragment embedded with interaction template element and associated with the video or audio data stream in one broadcast channel to a device; and receiving, by the apparatus from the device, in response to the delivery of the electronic service guide fragment, a pre-configured message that includes subscriber selection of one of the options, wherein the pre-configured message is generated based upon the pre-configured message template either during or after the event, wherein the event is related to a television program and a first interaction service offering included in the list of options comprises a voting interaction service offering for submitting a vote to interact with the television program and cost information for placing the vote.

23. The method of claim 22, wherein the pre-configured message template is associated with a pointer in the electronic service guide fragment.

24. The method of claim 22, wherein the pre-configured message template is associated with at least one of at least one sub-element and at least one attribute in metadata of the electronic service guide fragment.

25. The method of claim 24, wherein the at least one sub-element indicates an application for the device to transmit subscriber input via the pre-configured message template.

26. The method of claim 24, wherein the at least one attribute indicates a recipient of a message, message content, an attachment, or a combination thereof.

27. A method comprising:

receiving, by an apparatus, via one broadcast channel, an electronic service guide fragment associated with a broadcast event, the electronic service guide fragment having metadata mapped to and embedded with data of a pre-configured message template, the pre-configured message template being associated with a subscriber interaction service included in the event;

determining within the metadata, by the apparatus, an interaction template element corresponding to the pre-configured message template;

determining to display information relating to the pre-configured message template to a subscriber, wherein the information relating to the pre-configured message template includes a list of options of interaction service offerings for the subscriber to select; and compiling, at the apparatus, a pre-configured message that includes subscriber selection of one of the options, wherein the pre-configured message is compiled based upon the pre-configured message template either during or after the event, wherein the pre-configured message template is mapped in the electronic service guide fragment to a string according to extensible markup language schema, and the element comprises an attribute that indicates one e-mail recipient that is a participant in the broadcast event and a subject header for requesting the interaction service of the event to send an e-mail to the participant after the e-mail is displayed to the subscriber and the subscriber selects one option from the list of options.

28. The method of claim 27, wherein the interaction template element comprises an attribute that indicates a recipient of a message, message content, an attachment, or a combination thereof.

29. The method of claim 27, wherein the pre-configured message is compiled without receiving additional input by the subscriber, thereby sending the compiled message to the interaction service of the event.

30. The method of claim 27, wherein the determining of the element comprises:

parsing the electronic service guide fragment;

obtaining a pointer element and associated attributes based on the parsing; and compiling a predetermined interaction service offering based on the pointer element and associated attributes.

31. The method of claim 30, wherein the pointer element includes one or more universal resource identifiers, and the associated attributes are mapped into metadata corresponding to the electronic service guide fragment.

32. A non-transitory computer-readable storage medium carrying one or more sequences of one or more instructions which, when executed by one or more processors, cause an apparatus to at least perform the following steps:

receiving, via one broadcast channel, an electronic service guide fragment associated with a broadcast event, the electronic service guide fragment having metadata mapped to and embedded with data of a pre-configured message template, the pre-configured message template being associated with a subscriber interaction service included in the event;

determining within the metadata an interaction template element corresponding to the pre-configured message template;

determining to display information relating to the pre-configured message template to a subscriber, wherein the information relating to the pre-configured message template includes a list of options of interaction service offerings for the subscriber to select; and compiling a pre-configured message that includes subscriber selection of one of the options, wherein the pre-configured message is compiled based upon the pre-configured message template either during or after the event, wherein the pre-configured message template is mapped in the electronic service guide fragment to a string according to extensible markup language schema, and the element comprises an attribute that indicates one e-mail recipient that is a participant in the broadcast event and a subject header for requesting the interaction service of the event to send an e-mail to the participant after the e-mail is displayed to the subscriber and the subscriber selects one option from the list of options.

33. The non-transitory computer-readable storage medium of claim 32, wherein the pre-configured message is compiled without receiving additional input by the subscriber, thereby sending the compiled message to the interaction service of the event.

34. The non-transitory computer-readable storage medium of claim 32, wherein the apparatus is caused to further perform:

parsing the electronic service guide fragment;

obtaining a pointer element and associated attributes based on the parsing; and compiling a predetermined interaction service offering based on the pointer element and associated attributes.

35. The non-transitory computer-readable storage medium of claim 34, wherein the apparatus is caused to further perform: mapping the associated attributes into metadata.

36. A non-transitory computer-readable storage medium carrying one or more sequences of one or more instructions which, when executed by one or more processors, cause an apparatus to at least perform the following steps:

receiving data associated with a broadcast event,—the data including an interaction template element associated with a pre-configured message template, the pre-configured message template being associated with an interaction service of the event;

assembling the data into an electronic service guide fragment associated with the event, the electronic service guide fragment having metadata relating to displaying a list of options of interaction service offerings for a subscriber;

mapping and embedding the interaction template element into the metadata of the electronic service guide fragment;

determining to deliver the electronic service guide fragment embedded with the interaction template element via one broadcast channel; and receiving, in response to the delivery of the electronic service guide fragment, a pre-configured message that includes subscriber selection of one of the options, wherein the pre-configured message is generated based upon the pre-configured message template either during or after the event, wherein the interaction template element comprises at least one attribute associated with the pre-configured message template, the at least one attribute indicating an e-mail recipient that is a participant in the broadcast event and a subject header for requesting the interaction service of the event to send an e-mail to the participant after the e-mail is displayed to the subscriber.

* * * * *